(12) United States Patent
Lawrence et al.

(10) Patent No.: US 7,743,634 B1
(45) Date of Patent: Jun. 29, 2010

(54) IMMOBILIZING DEVICE FOR TRACKED VEHICLES

(76) Inventors: Richard Lawrence, 3353 Howard Common, Fremont, CA (US) 94536; Larry A. Cull, 16280 Southwood, Cottonwood, CA (US) 96022

( * ) Notice: Subject to any disclaimer, the term of this patent is extended or adjusted under 35 U.S.C. 154(b) by 0 days.

(21) Appl. No.: 12/246,342

(22) Filed: Oct. 6, 2008

Related U.S. Application Data

(60) Provisional application No. 60/977,620, filed on Oct. 4, 2007.

(51) Int. Cl.
 *E05B 73/00* (2006.01)
(52) U.S. Cl. .................. 70/14; 70/18; 70/58; 70/209; 280/814; 180/190
(58) Field of Classification Search ............ 70/14, 70/18, 58, 209, 237; 280/814; 180/190
 See application file for complete search history.

(56) References Cited

U.S. PATENT DOCUMENTS

| | | | | |
|---|---|---|---|---|
| 543,547 | A * | 7/1895 | Geistwite | 70/236 |
| 1,443,009 | A | 1/1923 | Davis | |
| 3,959,995 | A * | 6/1976 | Fletcher | 70/18 |
| 4,696,449 | A * | 9/1987 | Woo et al. | 248/553 |
| 4,896,519 | A * | 1/1990 | Pitts | 70/50 |
| 5,052,198 | A * | 10/1991 | Watts | 70/58 |
| 5,109,683 | A * | 5/1992 | Cartwright | 70/14 |
| 5,265,449 | A * | 11/1993 | Rashleigh | 70/18 |
| 5,271,636 | A * | 12/1993 | Mohrman et al. | 280/304.1 |
| 5,329,793 | A * | 7/1994 | Chen | 70/209 |
| 5,582,044 | A * | 12/1996 | Bolich | 70/58 |
| 5,724,839 | A * | 3/1998 | Thering | 70/18 |
| 5,730,008 | A * | 3/1998 | Case et al. | 70/18 |
| 5,802,887 | A * | 9/1998 | Beland | 70/14 |
| 5,927,108 | A * | 7/1999 | Pierce | 70/19 |
| 6,012,739 | A * | 1/2000 | Weiss et al. | 280/814 |
| 6,058,749 | A | 5/2000 | Rekemeyer | |
| 6,112,560 | A * | 9/2000 | Mabee | 70/14 |
| 6,240,753 | B1 * | 6/2001 | Wu | 70/209 |
| 6,334,345 | B1 | 1/2002 | Lee | |
| 6,553,797 | B2 * | 4/2003 | Witchey | 70/209 |
| 6,672,115 | B2 | 1/2004 | Wyers | |
| 6,796,154 | B2 | 9/2004 | Gebow et al. | |
| 6,938,734 | B2 | 9/2005 | Curl | |
| 6,941,780 | B1 | 9/2005 | Marr | |
| 7,174,752 | B2 * | 2/2007 | Galant | 70/58 |
| 2004/0089036 | A1 | 5/2004 | Gebow et al. | |
| 2005/0252258 | A1 | 11/2005 | Peacock | |
| 2006/0081025 | A1 | 4/2006 | Smith et al. | |
| 2008/0282754 | A1 | 11/2008 | Lawrence | |

\* cited by examiner

*Primary Examiner*—Suzanne D Barrett
(74) *Attorney, Agent, or Firm*—James E. Eakin

(57) ABSTRACT

A locking mechanism for immobilizing tracked vehicles comprises a first bar for extending between the treads of a tracked vehicle. A second bar, affixed at one end to the first bar, extends parallel to the first bar and passes through slots in a plate on the tracked vehicle, the plate being positioned on the opposite side of the track as the treads. A rotatable member is affixed to the first bar at a distance from the second bar, and has an orifice therethrough. A lockable bar passes through slots in the plate and then through the orifice in the rotatable member. The lockable bar has an enlarged portion to prevent it from being passed through the orifice in a first direction. A lock attaches to the remaining end of the lockable bar to prevent the bar from passing through the orifice in the opposite direction.

5 Claims, 3 Drawing Sheets

IMMOBILIZING DEVICE FOR TRACKED VEHICLES

RELATED APPLICATION

This application claims the benefit of provisional U.S. Patent Application Ser. No. 60/977,620, filed Oct. 4, 2007, having the same title and inventors as the present application, and incorporated herein by reference.

FIELD OF THE INVENTION

The present invention relates generally to vehicular locking mechanisms, and more particularly relates to vehicular locking mechanisms which substantially immobilize tracks on vehicles such as snowmobiles.

BACKGROUND OF THE INVENTION

Theft of vehicles is an ongoing problem. This is particularly true of small, easily transported vehicles such as snowmobiles. Such vehicles tend to be relatively small and light, such that one or two people can easily roll even a locked vehicle into a truck or trailer. As a result, many thefts of vehicles such as snowmobiles are crimes of opportunity, and could be avoided if the vehicle were not so easily moved.

At the same time, any locking mechanism which would immobilize the vehicle must also be easily locked onto and unlocked from the vehicle. In addition, it should preferably be light and small enough that it can be carried with the vehicle for use in remote locations. This combination of factors has proven elusive in the prior art, and thus there has been a long felt need for a vehicular locking mechanism meeting these criteria.

SUMMARY OF THE INVENTION

The present invention provides an elegantly simple locking mechanism meeting the foregoing criteria. A first bar, substantially the width of a track, extends below the track, and typically fits between the treads of a track. A rod, either formed integrally with or attached to bar, extends upward from the bar and then extends parallel to the bar so that the rod can extend through slots which occur on the upper portion of the tread. At the other end of the bar a rotatable joint connects to a second bar. Above the tread, a second rod extends through another slot in the tread, and passes through an orifice in the second bar. A locking mechanism positioned outward of the tread affixes the second rod to the second bar, thus preventing the tread from being rotated any significant amount. Various alternative embodiments are also described. It will be appreciated by those skilled in the art that "above" and "below" are relative terms used for convenience of discussion only, and are not limiting.

THE FIGURES

DETAILED DESCRIPTION OF THE INVENTION

Figure 1:
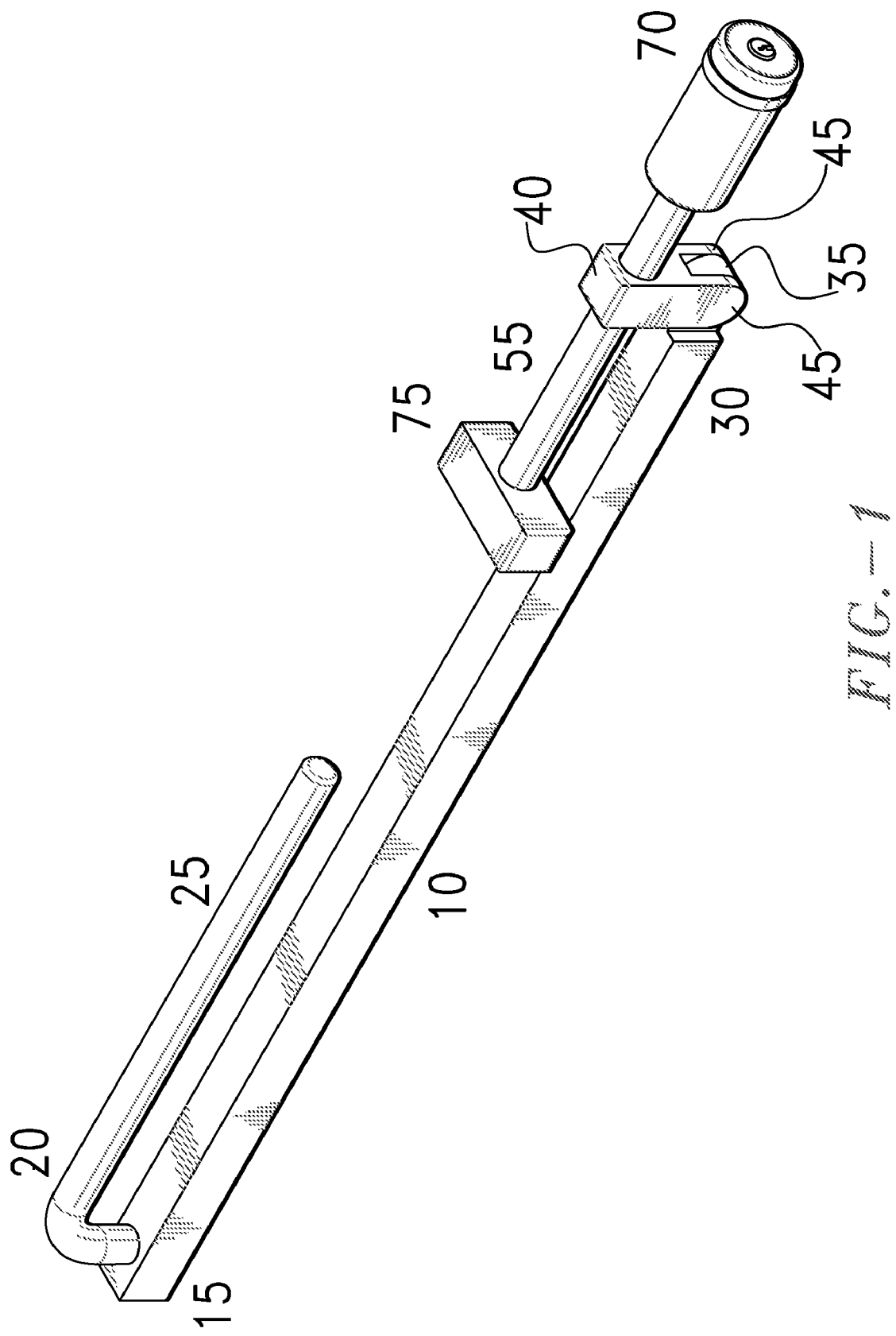
FIG. 1 illustrates an embodiment of the present invention suitable for use on the tracks of a vehicle such as a snowmobile.
Figure 2:
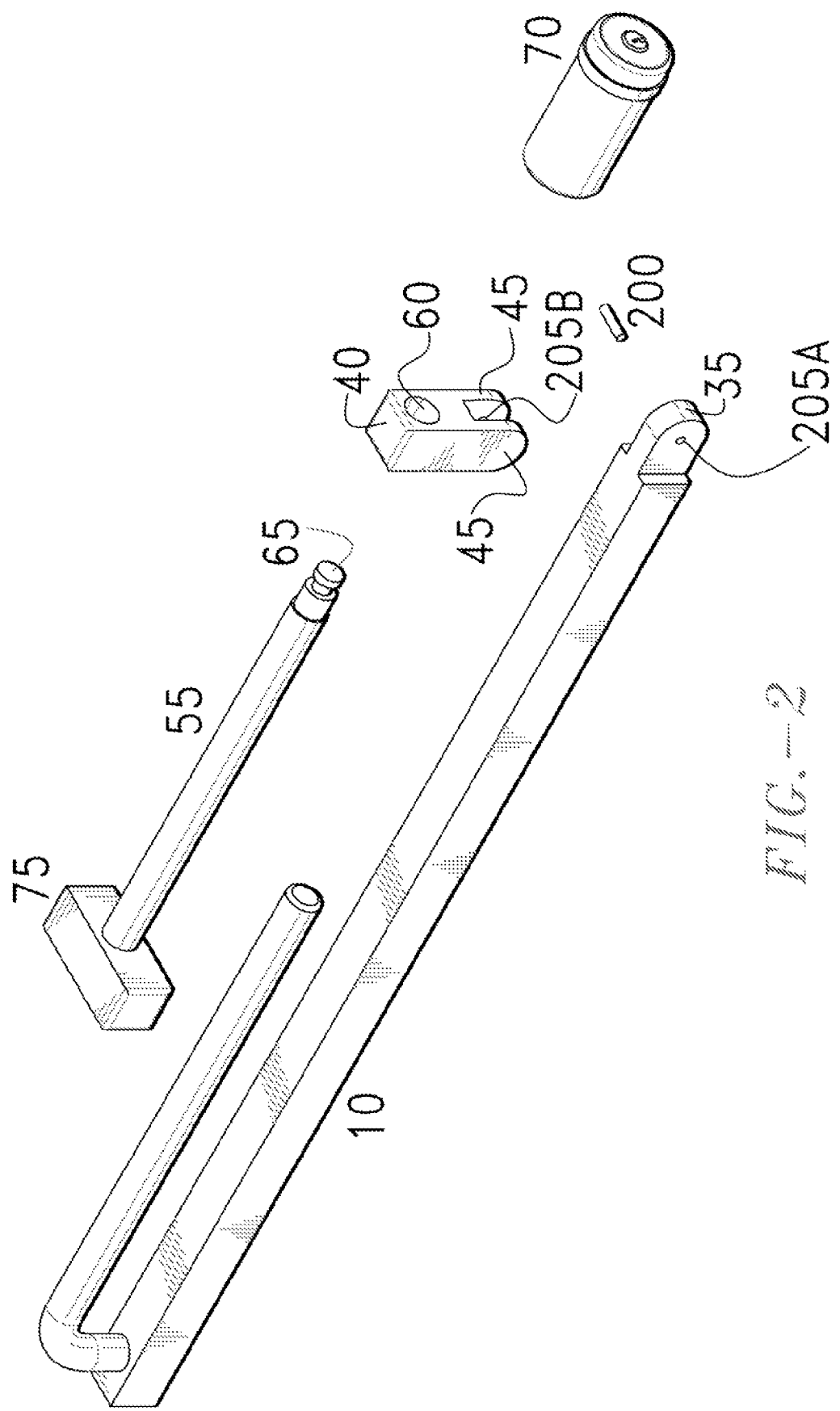
FIG. 2 shows in exploded perspective view the elements of the embodiment shown in FIG. 1.
Figure 3:
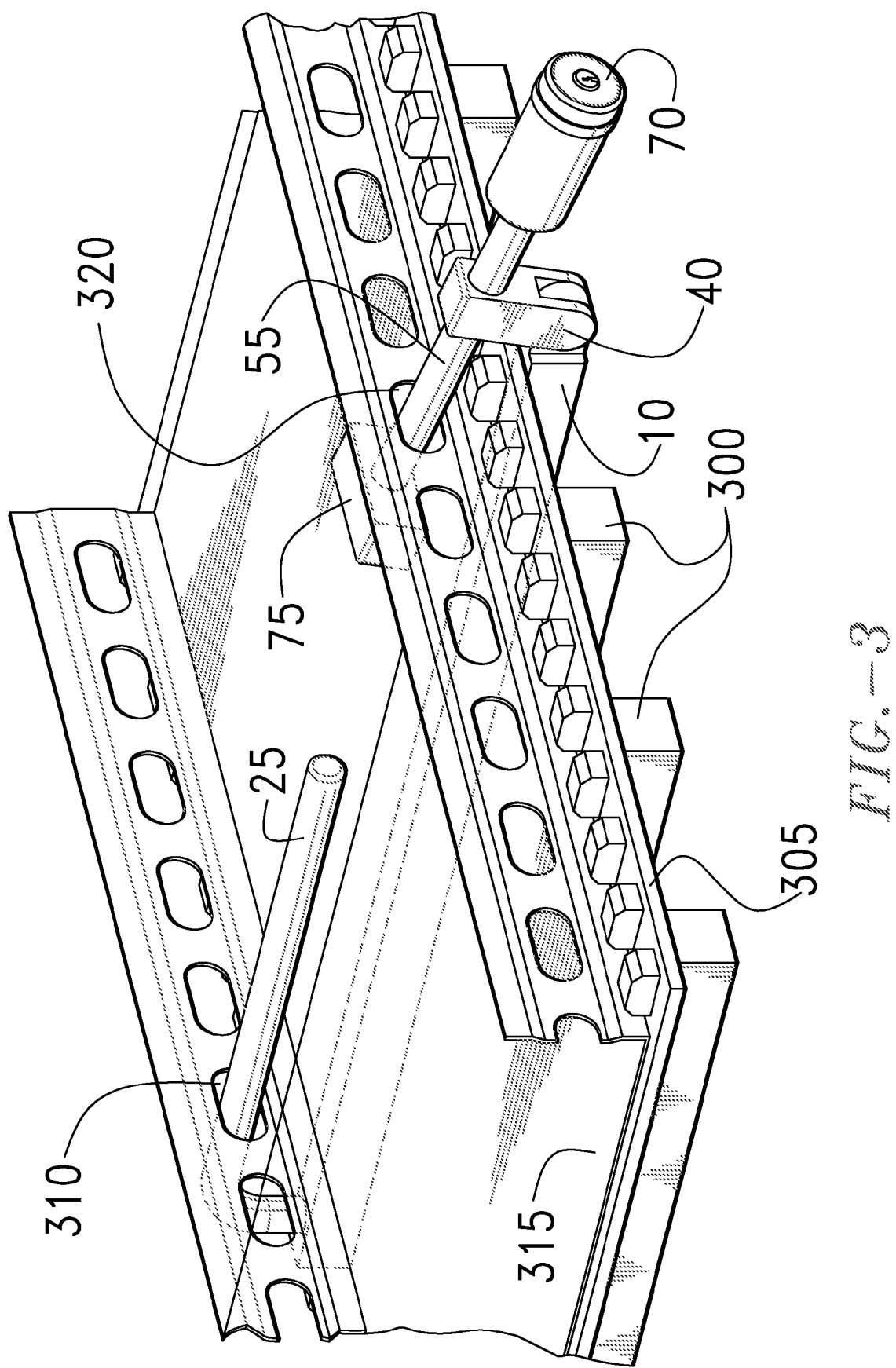
FIG. 3 illustrates the embodiment of FIG. 1 affixed to the track of a vehicle such as a snowmobile.

Referring first to FIGS. 1-3, a first embodiment of the present invention can be appreciated. An first bar 10 is configured to be slightly longer than the width of the track on the vehicle to be immobilized. In addition, in some embodiments the first bar 10 is typically wide enough to substantially fill the space between two adjacent treads 300 [best seen in FIG. 3] on the track 305 of the vehicle, only the relevant part of which is shown in FIG. 3. Extending from a first end 15 of the bar 10 is a first rod 20, which can be formed integrally with the bar 10 or can be affixed thereto by any suitable means such as welding, bolting, and so on. The first rod 20 extends upwardly from the bar 10 and then turns at a substantially right angle so that a portion 25 of the rod 20 extends parallel to the bar 10. The rod 20, or at least the portion 25 thereof, is configured to be of a size suitable for passing through slots 310 which typically occur in the plate 315 over which the track 305 rides. The track 305 of the vehicle is therefore immobilized once the locking mechanism of the present invention is put into place. The portion 25 is typically long enough to prevent the slotted portion of the plate 315 from being manipulated past the end of the portion 25.

At the opposite end 30 of the bar 10, a flange 35 is formed for connecting to a second bar 40. The second bar includes a pair of mating flanges 45 which extend on either side of the flange 35, with a rod 200 [best seen in FIG. 2] extending through collinear holes 205A-B in the flanges 35 and 45 to affix the second bar 40 to the first bar 10. The flanges therefore form a rotatable joint 50. The rotatable joint permits the bar 10 to be shoved easily through the snow underneath the track, after which the second bar 40 can be rotated upward. In some embodiments, a detent may be provided to keep the second bar 40 aligned with the bar 10.

A second rod 55, of substantially the same size stock as the portion 25 of the first rod 20, is configured so that the user can pass the rod 55 through a slot 320 in the plate 315 [FIG. 3] at the opposite side of the track 305 from the rod 20. The rod 55 then is passed through an orifice 60 on the second bar 40. The rod 55 has formed therein a retention mechanism 65 [FIG. 2], typically comprising, for example, an annulus, teeth, or other deformations, which permit a lock 70 to be affixed thereto. In addition, the second rod 55 can comprise, at the end opposite from the retention mechanism 65, an enlarged portion 75 which facilitates the user's handling of the rod and also assists in preventing the track from being manipulated around the end of the rod 55. Once the user has positioned the bar 20 under the track, with the rod 20 extending through the slot 310 in the plate 315 on one side and the second rod 55 extending through the slot 320 and the orifice 60, affixing the lock 70 immobilizes the tread so that the vehicle is protected against theft.

It will be appreciated that, although the bars described herein are shown as having a square or rectangular cross-section, any cross-section is suitable in at least some embodiments. Likewise, although the rods are shown as having a substantially circular cross-section, any cross-section is acceptable for at least some embodiments. It will be appreciated by those skilled in the art that, although the embodiment described herein is shown as passing through slots in the tracks, some tracks do not include such slots and thus some embodiments of the invention are configured without the need to pass through such slots. In addition, the bars and rod described herein can be made of any suitably durable material, including steel, hardened steels and alloys, titanium, aluminum or other metals, but also including any other materials that are not readily broken or cut.

It will also be appreciated that, in some embodiments the second bar 40 is formed integrally with or rigidly connected to the first bar 10, thus eliminating the mating flanges 35 and 45, thus eliminating the joint 50. In some such embodiments, the orifice 60 may be formed slightly larger than the second rod 55, to facilitate passing the rod 55 through the bar 40.

To prevent the shafts from being sawn through, a sleeve or bushing may be provided around the rods 20 and 55. The sleeve slips over the rod or shaft and rolls if a thief attempts to saw through the shaft. The sleeve may be made of any suitable material, although a material resistant to saw cuts is particularly suitable for some embodiments. Depending upon the implementation, the sleeve may extend through the orifice to the junction of the shaft with the bar, or may extend only from the locking mechanism to the orifice in the wheel. In addition, a plate or washer may be provided between the locking mechanism and the sleeve.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A locking mechanism for tracked vehicles comprising
   a first bar having first and second ends,
   a second bar fixedly connected to the first bar and having a portion thereof substantially parallel to the first bar,
   a rotatable member connected to the second end of the first bar, the rotatable member having a first orifice therethrough,
   a lockable bar adapted to pass through a second orifice in a plate on a tracked vehicle and thence through the first orifice, and
   a lock for fixedly connecting the lockable bar to the rotatable member.

2. The locking mechanism of claim 1 wherein the second bar is adapted to pass through an orifice in the track of the vehicle.

3. The locking mechanism of claim 1 wherein the lockable bar has a rigid portion affixed thereto of a size greater than the first orifice, thereby preventing the lockable bar from being passed through the first orifice when the lock is fixedly connected to the lockable bar.

4. The locking mechanism of claim 1 wherein the first bar is configured to fit between adjacent treads on a tracked vehicle.

5. A locking mechanism for tracked vehicles comprising
   a first bar having first and second ends,
   a second bar fixedly connected to the first end of the first bar and having a portion thereof substantially parallel to the first bar, the second bar adapted to pass through one of a plurality of slots in a plate on a tracked vehicle,
   a rotatable member rotatably connected to the second end of the first bar and having an orifice therethough,
   a lockable bar adapted to pass through another of a plurality of slots in the plate on the tracked vehicle and thence through the orifice on the rotatable member, the lockable bar having an enlarged portion to prevent the lockable bar from passing through the orifice in a first direction, and
   a lock adapted to be fixedly attached to the lockable bar to prevent the lockable bar from passing through the orifice in a second direction.

\* \* \* \* \*